United States Patent
He et al.

(10) Patent No.: US 9,984,304 B2
(45) Date of Patent: May 29, 2018

(54) METHOD AND SYSTEM FOR RECOGNIZING USER ACTIVITY TYPE

(71) Applicant: Huawei Technologies Co., Ltd., Shenzhen (CN)

(72) Inventors: Xiuqiang He, Shenzhen (CN); Gong Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 99 days.

(21) Appl. No.: 14/925,368

(22) Filed: Oct. 28, 2015

(65) Prior Publication Data

US 2016/0048738 A1    Feb. 18, 2016

Related U.S. Application Data

(63) Continuation of application No. PCT/CN2014/078103, filed on May 22, 2014.

(30) Foreign Application Priority Data

May 29, 2013    (CN) .......................... 2013 1 0207414

(51) Int. Cl.
| G06K 9/00 | (2006.01) |
|---|---|
| G06K 9/46 | (2006.01) |
| G06F 17/30 | (2006.01) |
| G06K 9/64 | (2006.01) |

(Continued)

(52) U.S. Cl.
CPC ......... *G06K 9/46* (2013.01); *G06F 17/30259* (2013.01); *G06F 17/30525* (2013.01); *G06K 9/00335* (2013.01); *G06K 9/52* (2013.01); *G06K 9/64* (2013.01); *G06K 9/6807* (2013.01);

(Continued)

(58) Field of Classification Search
CPC combination set(s) only.
See application file for complete search history.

(56) References Cited

U.S. PATENT DOCUMENTS

| 6,671,407 B1 | 12/2003 | Venkatesan et al. |
| 8,103,692 B2 | 1/2012 | Kim et al. |
| 8,179,440 B2 | 5/2012 | Ran et al. |

(Continued)

FOREIGN PATENT DOCUMENTS

| CN | 101221621 A | 7/2008 |
| CN | 102179048 A | 9/2011 |

(Continued)

OTHER PUBLICATIONS

Rai, Angshu et al., "Mining Complex Activities in the Wild via a Single Smartphone Accelerometer," Sensor KDD, Aug. 12, 2012, pp. 43-51.

(Continued)

*Primary Examiner* — Alex Liew
(74) *Attorney, Agent, or Firm* — Slater Matsil, LLP

(57) ABSTRACT

The present invention discloses a method and system for recognizing a user activity type, where the method includes: collecting an image of a location in which a user is located; extracting, from the image, characteristic data of an environment in which the user is located and characteristic data of the user; and obtaining, by recognition, an activity type of the user by using an image recognition model related to an activity type or an image library related to an activity type and the characteristic data.

8 Claims, 2 Drawing Sheets

(51) Int. Cl.
*G06K 9/52* (2006.01)
*G06K 9/68* (2006.01)

(52) U.S. Cl.
CPC ............... *G06T 2207/20224* (2013.01); *G06T 2207/30232* (2013.01)

(56) References Cited

U.S. PATENT DOCUMENTS

| | | | |
|---|---|---|---|
| 2006/0018516 A1* | 1/2006 | Masoud | G06K 9/00342 382/115 |
| 2008/0169929 A1 | 7/2008 | Albertson et al. | |
| 2009/0243844 A1* | 10/2009 | Ishidera | G08B 13/19615 340/540 |
| 2009/0297050 A1* | 12/2009 | Li | G06K 9/00684 382/225 |
| 2011/0123064 A1 | 5/2011 | Teng et al. | |
| 2011/0276396 A1 | 11/2011 | Rathod | |
| 2012/0030234 A1* | 2/2012 | Ramachandrula | G06F 17/30253 707/769 |

FOREIGN PATENT DOCUMENTS

| | | |
|---|---|---|
| CN | 102799873 A | 11/2012 |
| CN | 102811343 A | 12/2012 |
| CN | 102880854 A | 1/2013 |
| CN | 102880873 A | 1/2013 |

OTHER PUBLICATIONS

Yan, Zhixian et al., "Energy-Efficient Continuous Activity Recognition on Mobile Phones: An Activity-Adaptive Approach," 2012 16th International Symposium on Wearable Computers, IEEE, Jun. 18-22, 2012, pp. 17-24.

* cited by examiner

METHOD AND SYSTEM FOR RECOGNIZING USER ACTIVITY TYPE

This application is a continuation of International Application No. PCT/CN2014/078103, filed on May 22, 2014, which claims priority to Chinese Patent Application No. 201310207414.7, filed on May 29, 2013, both of which are incorporated herein by reference in their entireties.

TECHNICAL FIELD

The present invention relates to a method and system for recognizing a user activity type.

BACKGROUND

At present, a person may be continually photographed by using a surveillance camera to obtain multiple images; two-dimensional decomposition is performed on the obtained images to obtain moving tracks of different parts of the body; and an activity that is being performed by the person is obtained by further analyzing a similarity between the tracks. However, the foregoing obtained activities are all simple physical activities of the person, for example, walking and running, which are obviously limited.

SUMMARY

A main technical problem to be resolved in embodiments of the present invention is to provide a method and system for recognizing a user activity type, which can recognize a more complex activity type of a user, and a service is provided according to the user activity type.

According to a first aspect, a method for recognizing a user activity type is provided, including: collecting an image of a location in which a user is located; extracting, from the image, characteristic data of an environment in which the user is located and characteristic data of the user; and obtaining, by recognition, an activity type of the user by using an image recognition model related to an activity type and the characteristic data or by using an image library related to an activity type and the characteristic data.

With reference to an implementation manner of the first aspect, in a first possible implementation manner of the first aspect, the step of extracting, from the image, characteristic data of an environment in which the user is located and characteristic data of the user includes: extracting, from the image by using an image object recognition method, the characteristic data of the environment in which the user is located and the characteristic data of the user; and the step of obtaining, by recognition, an activity type of the user by using an image recognition model related to an activity type or a database related to an activity type and the characteristic data includes: matching the characteristic data by using a rule that is pre-learned by using an activity type rule model method or an activity type machine learning method, so as to obtain the activity type of the user.

With reference to an implementation manner of the first aspect, in a second possible implementation manner of the first aspect, the characteristic data is a hash sketch value; the step of extracting, from the image, characteristic data of an environment in which the user is located and characteristic data of the user includes: extracting a hash sketch value of the image by using an image hash characteristic extraction method; and the step of obtaining, by recognition, an activity type of the user by using an image recognition model related to an activity type or a database related to an activity type and the characteristic data includes: searching, according to a matching algorithm, the image library for an image matching the hash sketch value; searching for an annotation of the image matching the hash sketch value, where the annotation is used to indicate content included in the image matching the hash sketch value; and recognizing the activity type of the user according to the annotation.

With reference to the second possible implementation manner of the first aspect, in a third possible implementation manner of the first aspect, if the image matching the hash sketch value does not have the annotation, extracting, by using an image object recognition method, the characteristic data from the image matching the hash sketch value, and matching, by using a rule that is pre-learned by using an activity type rule model method and an activity type machine learning method, the characteristic data of the image matching the hash sketch value, so as to obtain the activity type of the user.

With reference to an implementation manner of the first aspect, in a fourth possible implementation manner of the first aspect, the method further includes: before the step of obtaining, by recognition, an activity type of the user by using an image recognition model or an image library related to an activity type and the characteristic data, collecting auxiliary information of the environment in which the user is located or auxiliary information of the user; and the step of obtaining, by recognition, an activity type of the user by using an image recognition model or an image library related to an activity type and the characteristic data includes: matching the characteristic data by using the image recognition model related to an activity type or the image library related to an activity type and the auxiliary information, so as to obtain the activity type of the user.

With reference to the fourth possible implementation manner of the first aspect, in a fifth possible implementation manner of the first aspect, the auxiliary information includes position information, acceleration information, light intensity information, and sound information.

A second aspect provides a system for recognizing a user activity type, and the system includes a first collecting module, configured to collect an image of a location in which a user is located; an extracting module, configured to extract, from the image, characteristic data of an environment in which the user is located and characteristic data of the user; and a recognizing module, configured to obtain, by recognition, an activity type of the user by using an image recognition model or an image library related to an activity type and the characteristic data.

With reference to an implementation manner of the second aspect, in a first possible implementation manner of the second aspect, the extracting module includes a first sub-extracting unit, where the first sub-extracting unit is configured to extract, from the image by using an image object recognition method, the characteristic data of the environment in which the user is located and the characteristic data of the user; and the recognizing module includes a first sub-recognizing unit, where the first sub-recognizing unit is configured to match the characteristic data by using a rule that is pre-learned by using an activity type rule model method or an activity type machine learning method, so as to obtain the activity type of the user.

With reference to an implementation manner of the second aspect, in a second possible implementation manner of the second aspect, the characteristic data is a hash sketch value; the extracting module includes a second sub-extracting unit, where the second sub-extracting unit is configured to extract a hash sketch value of the image by using an image hash characteristic extraction method; and the recognizing module includes a matching unit, a searching unit, and a second sub-recognizing unit, where the matching unit is configured to search, according to a matching algorithm, the image library for an image matching the hash sketch value; the searching unit is configured to search for an annotation of the image matching the hash sketch value, where the annotation is used to indicate content included in the image matching the hash sketch value; and the second sub-recognizing unit is configured to recognize the activity type of the user according to the annotation.

With reference to the second possible implementation manner of the second aspect, in a third possible implementation manner of the second aspect, the recognizing module further includes a third sub-extracting unit and a third sub-recognizing unit; where the third sub-extracting unit is configured to, when the searching unit does not find the annotation of the image matching the hash sketch value, extract, from the image matching the hash sketch value and by using an image object recognition method, the characteristic data of the environment in which the user is located and the characteristic data of the user; and the third sub-recognizing unit is configured to match, by using a rule that is pre-learned by using an activity type rule model method or an activity type machine learning method, the characteristic data of the image matching the hash sketch value, so as to obtain the activity type of the user.

With reference to an implementation manner of the second aspect, in a fourth possible implementation manner of the second aspect, a second collecting module is configured to collect auxiliary information of the environment in which the user is located or auxiliary information of the user; where the recognizing module is specifically configured to match the characteristic data by using the image recognition model related to an activity type or the image library related to an activity type and the auxiliary information, so as to obtain the activity type of the user.

With reference to the fourth possible implementation manner of the second aspect, in a fifth possible implementation manner of the second aspect, the auxiliary information includes position information, acceleration information, light intensity information, and sound information.

Beneficial effects of the embodiments of the present invention are as follows. By collecting an image that includes a user and is of a location in which the user is located, extracting, from the image, characteristic data of an environment in which the user is located and characteristic data of the user, and using an image recognition model related to an activity type or an image library related to an activity type and the characteristic data, a more complex activity type of the user can be recognized, and a corresponding service can be provided based on the activity type of the user.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
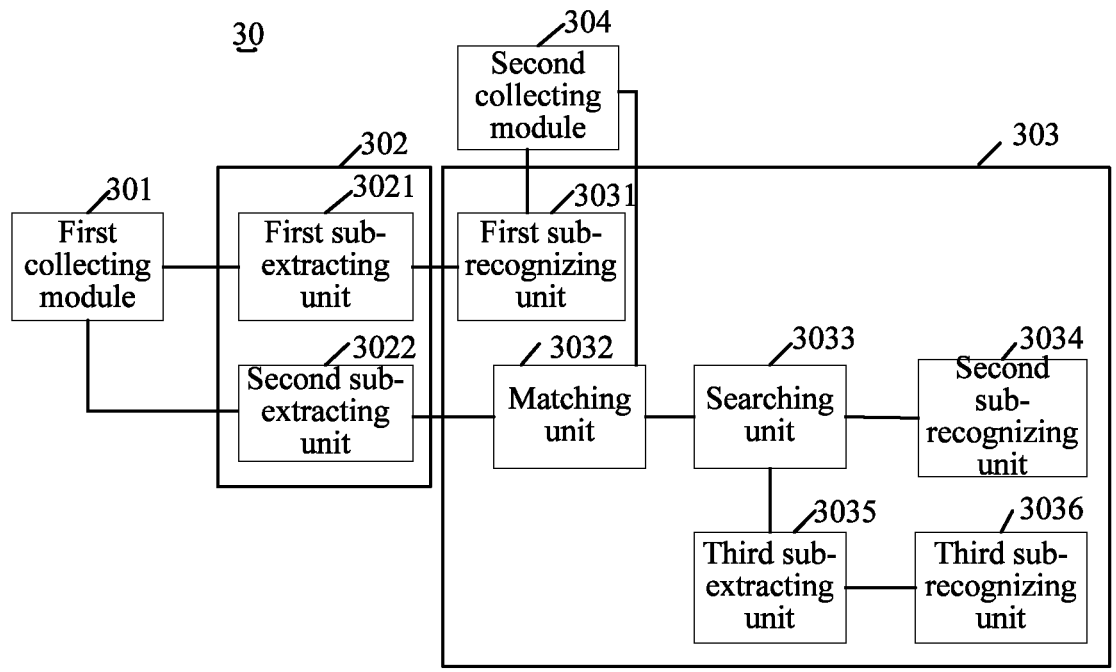
FIG. 1 is a schematic structural diagram of an embodiment of a system for recognizing a user activity type according to the present invention.

FIG. 1 is a schematic structural diagram of an embodiment of a system for recognizing a user activity type according to the present invention. As shown in the figure, the system 30 includes a first collecting module 301, an extracting module 302, and a recognizing module 303.

The first collecting module 301 collects an image of a location in which a user is located. The extracting module 302 extracts, from the image, characteristic data of an environment in which the user is located and characteristic data of the user. The recognizing module 303 obtains an activity type of the user by using an image recognition model related to an activity type or an image library related to an activity type and the characteristic data.

It should be noted that, the collecting module 301, the extracting module 302, and the recognizing module 303 may be disposed in a same device, and may also be disposed in different devices. If the collecting module 301, the extracting module 302, and the recognizing module 303 are disposed in different devices, this embodiment of the present invention further includes a sending module (not shown in the figure). For example, a collecting device (not shown in the figure) and a server (not shown in the figure) are disposed in the system 30. The collecting module 301 and the sending module are disposed in the collecting device; and the extracting module 302 and the recognizing module 303 are disposed in the server, where the sending module sends the image collected by the collecting module 301 to the server. Certainly, the extracting module 302 may also be disposed in the collecting device, and then the sending module sends the characteristic data extracted by the extracting module 302 to the server.

Optionally, the extracting module 302 includes a first sub-extracting unit 3021, and the recognizing module includes a first sub-recognizing unit 3031. The first sub-extracting unit is configured to extract, from the image collected by the collecting module 301 and by using an image object recognition method, the characteristic data of the environment in which the user is located and the characteristic data of the user. The characteristic data includes a physical characteristic, a structural characteristic and a data feature; for example, the image includes a person, a tree, an animal, ambient light, and a position. The first sub-recognizing unit 3031 matches the characteristic data by using a rule that is pre-learned by using an activity type rule model method or an activity type machine learning method, so as to obtain the activity type of the user. The rule pre-learned by the activity type rule model method or the activity type machine learning method uses characteristic data as a basic element, and determines the activity type of the user according to a combination of the characteristic data. Compared with a physical activity of a person, a more complex activity type, for example, playing a game by a person, and fighting by persons, may be recognized in this embodiment of the present invention.

Optionally, the extracting module 302 includes a second sub-extracting unit 3022. The recognizing module 303 includes a matching unit 3032, a searching unit 3033, a second sub-recognizing unit 3034, a third sub-extracting unit 3035, and a third sub-recognizing unit 3036.

The second sub-extracting unit 3022 is configured to extract, by using an image hash characteristic extraction method, a hash sketch value of the image collected by the collecting module 301. The matching unit 3032 searches, according to a matching algorithm, the image library for an image matching the hash sketch value. The searching unit 3033 searches for an annotation of the image matching the hash sketch value, where the annotation is used to indicate content included in the image matching the hash sketch value. The second sub-recognizing unit 3034 recognizes the activity type of the user according to the annotation. If the searching unit 3033 does not find the annotation of the image matching the hash sketch value, the third sub-extraction unit 3035 extracts, from the image matching the hash sketch value and by using an image object recognition method, the characteristic data of the environment in which the user is located and the characteristic data of the user. The third sub-recognizing unit 3036 matches, by using a rule that is pre-learned by using an activity type rule model method or an activity type machine learning method, the characteristic data of the image matching the hash sketch value, so as to obtain the activity type of the user. The activity type of the user obtained by recognition by the third sub-recognizing unit 3036 may be further recorded in the image library as the annotation, for which mapping relationship with the matched image is established.

The system 30 further includes a second collecting module 304. The second collecting module 304 collects auxiliary information of the environment in which the user is located or auxiliary information from the user. In this embodiment of the present invention, the auxiliary information includes position information, acceleration information, light intensity information, and sound information. The recognizing module 303 is specifically configured to match the characteristic data by using the image recognition model related to an activity type or the image library related to an activity type and the auxiliary information, so as to obtain, by recognition, the activity type of the user. Recognizing the activity type of the user and the auxiliary information can improve accuracy of recognition.

Further, the system 30 may further include an expansion module (not shown in the figure). The expansion module executes an expansion program according to the activity type of the user, for example, obtains a living habit of the user by analyzing the activity type of the user.

In this embodiment of the present invention, a collecting module 301 collects an image that includes a user and is of a location in which the user is located; an extracting module 302 extracts, from the image, characteristic data of an environment in which the user is located and characteristic data of the user; and the recognizing module 303 can recognize a more complex activity type of the user by using an image recognition model related to an activity type or an image library related to an activity type and the characteristic data, and a corresponding service is provided based on the activity type of the user.

Figure 2:
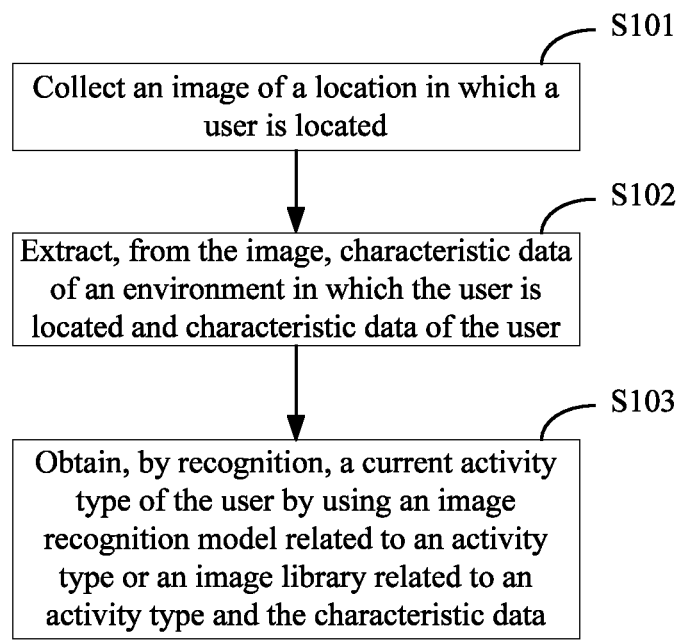
FIG. 2 is a flowchart of a first embodiment of a method for recognizing a user activity type according to the present invention.

FIG. 2 is a flowchart of a first embodiment of a method for recognizing a user activity type according to the present invention. As shown in the figure, the method includes the following steps.

Step S101: Collect an image of a location in which a user is located.

Content in the image includes a surrounding environment in which the user is located and the user. A condition for starting to collect the image of the location in which the user is located may be preset, and on the premise that the preset condition is satisfied, the image of the location in which the user is located is automatically collected.

Step S102: Extract, from the image, characteristic data of an environment in which the user is located and characteristic data of the user.

In this embodiment of the present invention, the characteristic data may be a hash sketch value, where the hash sketch value is extracted from the image by using an image hash characteristic extraction method; and the characteristic data may also be characteristic information extracted from the image according to an image object recognition method, for example, the image includes a person, a tree, an animal, ambient light, and a position.

Step S103: Obtain, by recognition, an activity type of the user by using an image recognition model related to an activity type or an image library related to an activity type and the characteristic data.

The image recognition model related to an activity type refers to a rule that is obtained in advance by learning and used to determine a user activity type; for example, characteristic data included in an image recognition model 1 related to an activity type is a basketball, a person, and a basketball stand, and then the image recognition model 1 related to an activity type obtains an activity type that the user is on a basketball court. Compared with a physical activity of a person, an activity type of the user obtained in this embodiment of the present invention is more complex.

If the characteristic data may be a hash sketch value, an image matching the hash sketch value may be searched for in the image library according to a matching algorithm, and the activity type of the user is recognized according to the image. Searching for an image matching the hash sketch value in the image library according to a matching algorithm is specifically: establishing in advance a hash sketch value for each image in the image library according to the image hash characteristic extraction method. In step S103, the extracted hash sketch value may directly match a hash sketch value stored in the image library, so as to find a matched hash sketch value, and further find a matched image by using the matched hash sketch value. It should be noted that the matching herein refers to that a difference between the extracted hash sketch value and a hash sketch value of the matched image that is found from the image library does not exceed a predefined value.

Further, a corresponding service may be further provided based on the activity type of the user; for example, a habit of the user is further obtained by analyzing types of daily activities of the user.

In this embodiment of the present invention, by collecting an image that includes a user and is of a location in which the user is located, extracting, from the image, characteristic data of an environment in which the user is located and characteristic data of the user, and using an image recognition model related to an activity type or an image library related to an activity type and the characteristic data, a more complex activity type of the user can be recognized, and a corresponding service can be provided based on the activity type of the user.

Figure 3:
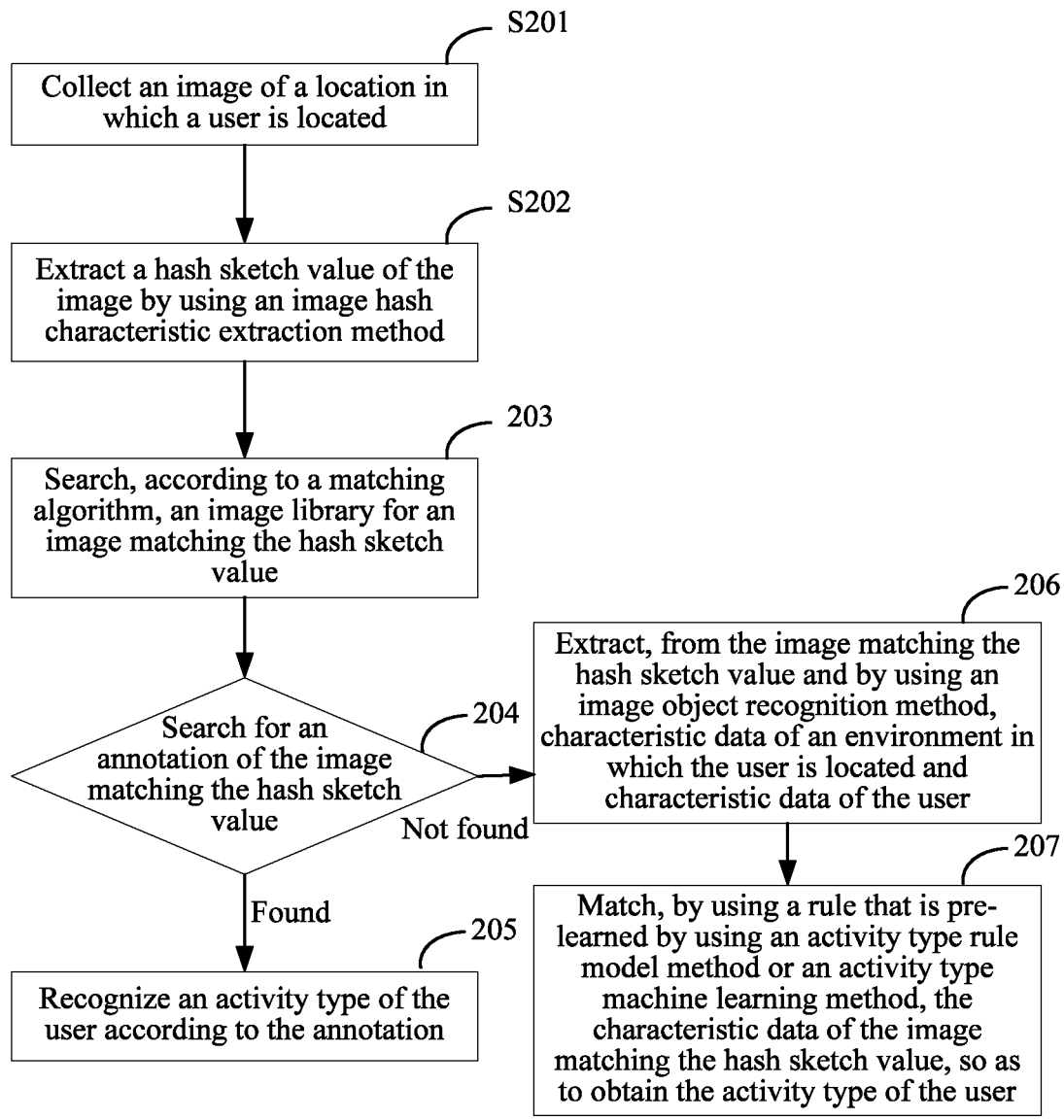
FIG. 3 is a flowchart of a second embodiment of a method for recognizing a user activity type according to the present invention.

FIG. 3 is a flowchart of a second embodiment of a method for recognizing a user activity type according to the present invention. As shown in the figure, the method includes the following steps.

Step S201: Collect an image of a location in which a user is located.

Content in the image includes a surrounding environment in which the user is located and the user. A condition for starting to collect the image of the location in which the user is located may be preset, and on the premise that the preset condition is satisfied, the image of the location in which the user is located is automatically collected.

Step S202: Extract a hash sketch value of the image by using an image hash characteristic extraction method.

The hash sketch value refers to content of an image recorded in a form of a number; a different image has a different hash sketch value, which is equivalent to an image texture characteristic. In this embodiment of the present invention, the hash sketch value is a set of binary codes; for different images, binary codes that represent hash sketch values are different, but lengths of the binary codes are the same. The image hash characteristic extraction method may be a method based on data independence, for example, LSH (Location Sensitive Hash) and SIKH (shift invariant kernel hashing); or the image hash characteristic extraction method may be a method based on data relevance, for example, MLH (Minimal Loss Hashing), Semantic Hashing, and Spectral Hashing.

Step S203: Search, according to a matching algorithm, an image library for an image matching the hash sketch value.

A hash sketch value of an image in the image library may be extracted in advance by using the image hash characteristic extraction method, and a mapping relationship between the hash sketch value and the image is established. Then, step S203 is specifically: matching the extracted hash sketch value with a hash sketch value in the image library, so as to obtain a matched hash sketch value, and further obtain a matched image. Certainly, a hash sketch value of an image in the image library may also not be extracted in advance, and a hash sketch value of a relevant image is extracted only when matching is performed.

It should be note that, the matching herein refers to that a Hamming distance between hash sketch values is minimal, where if the Hamming distance is smaller, the hash sketch values are more matched, and two images are more similar. The Hamming distance refers to the number of corresponding bits, of which bit values are different, between two binary codes that represent hash sketch values and are with a same length; for example, starting from the first bit, 10101 and 00110 are different in the first bit, the fourth bit, and the fifth bit in sequence, and then the Hamming distance is 3.

Step S204: Search for an annotation of the image matching the hash sketch value, where the annotation is used to indicate content included in the image matching the hash sketch value. If the annotation is found, proceed to step S205; otherwise, proceed to step S206.

The annotation is established in advance in the image library, and a one-to-one mapping relationship with an image in the image library is established; the annotation is used to indicate content included in the image, and the content of the image may be directly understood by using the annotation, or the annotation directly indicates an activity type.

Step S205: Recognize an activity type of the user according to the annotation.

Step S206: Extract, by using an image object recognition method, characteristic data from the image matching the hash sketch value.

The characteristic data includes a physical characteristic, a structural characteristic, and a data feature; for example, the image includes a person, a tree, an animal, ambient light, and a position.

Step S207: Match, by using a rule that is pre-learned by using an activity type rule model method or an activity type machine learning method, the characteristic data of the image matching the hash sketch value, so as to obtain the activity type of the user.

The rule pre-learned by the activity type rule model method or the activity type machine learning method is based on the characteristic data; for example, characteristic data included in an image recognition model 1 related to an activity type is a basketball, a person, and a basketball stand, and then the image recognition model 1 related to an activity type obtains an activity type that the user is on a basketball court.

Further, the obtained activity type of the user may be further recorded in the image library as the annotation of the image matching the hash sketch value, and a corresponding service is provided according to the activity type of the user.

In another implementation of the present invention, an activity type of a user may also be recognized by using an image object recognition method and an image recognition model related to an activity type, and then steps S205-S207 may be not included in this embodiment of the present invention; and step S203 is specifically: extracting, from the image by using an image object recognition method, characteristic data of an environment in which the user is located and characteristic data of the user.

The characteristic data includes a physical characteristic, a structural characteristic, and a data feature; for example, the image includes a person, a tree, an animal, ambient light, and a position.

Step S204 is specifically: Matching, by using a rule that is pre-learned by using an activity type rule model method or an activity type machine learning method, the characteristic data of the image matching the hash sketch value, so as to obtain the activity type of the user.

The rule pre-learned by the activity type rule model method or the activity type machine learning method is based on the characteristic data; the activity type of the user is determined according to a combination of the characteristic data; for example, characteristic data included in an image recognition model 1 related to an activity type is a basketball, a person, and a basketball stand, and then the image recognition model 1 related to an activity type obtains an activity type that the user is on a basketball court. Compared with a physical activity of a person, an activity type of the user obtained in this embodiment of the present invention is more complex.

In this embodiment of the present invention, by collecting an image that includes a user and is of a location in which the user is located, extracting, from the image, characteristic data of an environment in which the user is located and characteristic data of the user, and using an image recognition model related to an activity type or an image library related to an activity type and the characteristic data, a more complex activity type of the user can be recognized, and a corresponding service can be provided based on the activity type of the user.

The foregoing descriptions are merely the embodiments of the present invention, and the protection scope of the present invention is not limited thereto. All equivalent structure or process changes made according to the content of this specification and accompanying drawings in the present invention or by directly or indirectly applying the present invention in other related technical fields shall fall within the protection scope of the present invention.

What is claimed is:

1. A method for recognizing a user activity type, the method comprising:

collecting an image of a location in which a user is located;

extracting, from the image, environmental characteristic data that is characteristic of an environment in which the user is located, and user characteristic data of the user, wherein the environmental characteristic data include data related to one or more activity-related objects, other than the user; and obtaining, by recognition, a user activity type by using an image recognition model or an image library related to an activity type and further according to a match between an annotation of an image in the image library and a hash sketch value representing the environmental characteristic data and user characteristic data, wherein the activity type is associated with the one or more activity-related objects.

2. The method according to claim 1, wherein obtaining the user activity type comprises using the image recognition model related to the activity type.

3. The method according to claim 1, wherein obtaining the user activity type comprises using the image library related to an activity type.

4. The method according to claim 1, wherein the extracting the environmental characteristic data and the user characteristic data comprises extracting the environmental characteristic data and the user characteristic data from the image by using an image object recognition method; and wherein the obtaining the user activity type comprises matching the environmental characteristic data and user characteristic data by using a rule that is pre-learned by using an activity type rule model method or an activity type machine learning method, so as to obtain the user activity type.

5. The method according to claim 1, wherein the environmental characteristic data and user characteristic data is the hash sketch value;

wherein the extracting the environmental characteristic data and the user characteristic data comprises extracting a hash sketch value of the image by using an image hash characteristic extraction method; and wherein the obtaining the user activity type comprises:

searching, according to a matching algorithm, the image library for an image matching the hash sketch value;

searching for the annotation of the image matching the hash sketch value, wherein the annotation indicates content comprised in the image matching the hash sketch value; and recognizing the user activity type according to the annotation.

6. The method according to claim 5, wherein the method further comprises, when the image matching the hash sketch value does not have the annotation:

extracting the environmental characteristic data and user characteristic data from the image matching the hash sketch value by using an image object recognition method; and matching the environmental characteristic data and user characteristic data of the image matching the hash sketch value by using a rule that is pre-learned by using an activity type rule model method and an activity type machine learning method, so as to obtain the user activity type.

7. The method according to claim 1, wherein the method further comprises collecting, before the obtaining the user activity type, auxiliary information of the user environment or auxiliary information of the user; and wherein the obtaining the user activity type comprises matching the environmental characteristic data and user characteristic data by using the image recognition model related to the user activity type or the image library related to the activity type and the auxiliary information, so as to obtain the user activity type.

8. The method according to claim 7, wherein the auxiliary information comprises position information, acceleration information, light intensity information, and sound information.

* * * * *